US008321846B2

(12) United States Patent
Chatterjee

(10) Patent No.: US 8,321,846 B2
(45) Date of Patent: Nov. 27, 2012

(54) EXECUTABLE TEMPLATE

(75) Inventor: Ramkrishna Chatterjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1049 days.

(21) Appl. No.: 12/291,751

(22) Filed: Nov. 13, 2008

(65) Prior Publication Data

US 2010/0122241 A1 May 13, 2010

(51) Int. Cl.
 *G06F 9/45* (2006.01)
(52) U.S. Cl. ......... 717/140; 717/141; 717/143; 717/146
(58) Field of Classification Search ........................ None
See application file for complete search history.

(56) References Cited

U.S. PATENT DOCUMENTS

| | | | | |
|---|---|---|---|---|
| 5,327,568 A * | 7/1994 | Maejima et al. | ............ | 717/141 |
| 5,966,535 A * | 10/1999 | Benedikt et al. | ............ | 717/143 |
| 6,405,368 B1 * | 6/2002 | Freyburger | ............ | 717/140 |
| 6,760,905 B1 * | 7/2004 | Hostetter et al. | ............ | 717/140 |
| 6,772,413 B2 * | 8/2004 | Kuznetsov | ............ | 717/140 |
| 6,968,541 B1 * | 11/2005 | Hanson et al. | ............ | 717/140 |
| 7,225,438 B2 * | 5/2007 | Hostetter et al. | ............ | 717/140 |
| 7,386,797 B1 | 6/2008 | Chatterjee et al. | | |
| 7,665,074 B2 * | 2/2010 | Pandit et al. | ............ | 717/143 |
| 8,091,071 B2 * | 1/2012 | Tsantilis | ............ | 717/143 |
| 2003/0009747 A1 * | 1/2003 | Duran | ............ | 717/146 |
| 2004/0044989 A1 * | 3/2004 | Vachuska et al. | ............ | 717/108 |
| 2006/0195494 A1 * | 8/2006 | Dietrich | ............ | 708/110 |
| 2007/0083850 A1 * | 4/2007 | Kapoor et al. | ............ | 717/106 |
| 2007/0124373 A1 | 5/2007 | Chatterjee et al. | | |
| 2007/0214216 A1 | 9/2007 | Carrer et al. | | |
| 2007/0271251 A1 * | 11/2007 | Levine et al. | ............ | 707/4 |
| 2008/0104501 A1 * | 5/2008 | Sattler et al. | ............ | 715/224 |
| 2008/0127139 A1 * | 5/2008 | Skaistis | ............ | 717/143 |
| 2008/0148157 A1 * | 6/2008 | Kamdar et al. | ............ | 715/747 |
| 2009/0249374 A1 * | 10/2009 | Hepper et al. | ............ | 719/332 |
| 2009/0265608 A1 * | 10/2009 | Molenaar | ............ | 715/234 |
| 2010/0005115 A1 * | 1/2010 | Richter et al. | ............ | 707/101 |

OTHER PUBLICATIONS

Weverton Luis de Costa Cordeiro et al., A Template-based Solution to Support Knowledge Reuse in IT Change Design, IEEE 978-1-4244-2066-7, Apr. 7-11, 2008, [Retrieved on Jun. 26, 2012]. Retrieved from the internet: <URL:http://ieeexplore.ieee.org/stamp/stamp.jsp?tp=&arnumber=4575155> 8 Pages (355-362).*

Yih-Farn Chen et al., A C++ Data Model Supporting Reachability Analysis and Dead Code Detection, IEEE vol. 24 No. 9, Sep. 1998, [Retrieved on Jun. 26, 2012]. Retrieved from the internet: <URL: http://ieeexplore.ieee.org/stamp/stamp.jsp?tp=&arnumber=713323> 13 Pages (682-694).*

Richard Quintero et al., A Software Template Approach to Building Complex Large-Scale Intelligent Control Systems, Aug. 1993, [Retrieved on Jun. 26, 2012]. Retrieved from the internet: <URL: http://ieeexplore.ieee.org/stamp/stamp.jsp?tp=&arnumber=397723> 6 Pages (58-63).*

* cited by examiner

*Primary Examiner* — Don Wong
*Assistant Examiner* — Anibal Rivera
(74) *Attorney, Agent, or Firm* — Kraguljac Law Group, LLC

(57) ABSTRACT

Systems, methods, and other embodiments associated with executable templates are described. One example method includes generating an executable template from a set of template data. When an executable template is executed, the executable template creates one or more instantiated entities. These instantiated entities may then be combined with entities created from portions of the original template that were not compilable into the executable format.

10 Claims, 10 Drawing Sheets

EXECUTABLE TEMPLATE

BACKGROUND

A template is a blueprint for creating a new entity. A template captures a frequently used pattern, facilitating uniformity and best practice enforcement across entities created using the template. For example, a template may allow a user to quickly generate a new document, file, data structure, web page, and so on, without having to rebuild commonly used elements from scratch. In another example, best practice solution patterns designed by an expert may be captured in templates and reused in projects, aiding in best practice enforcement, and making the expert's knowledge available to multiple projects in the expert's domain of specialization.

The process of creating a new entity using a given template is called template instantiation. Conventional approaches to instantiation include template interpretation approaches that include retrieving a serialized representation of the template, parsing the serialized representation, and traversing the in-memory intermediate representation while calling appropriate high-level system-specific middle-tier APIs to generate the required entities. As a result, template interpretation approaches may incur repeated template retrieval and parsing costs for each instantiation operation because the template is loaded to the middle tier and parsed each time the template is instantiated. Additionally, as the middle tier may make multiple database calls and service calls, multiple round trips and cycles of processing may be required to complete a request. Therefore, memory and processing requirements for template instantiation may be high, and response time may be degraded, due to the number of operations performed by the middle tier when a template is instantiated in the conventional manner.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 7:
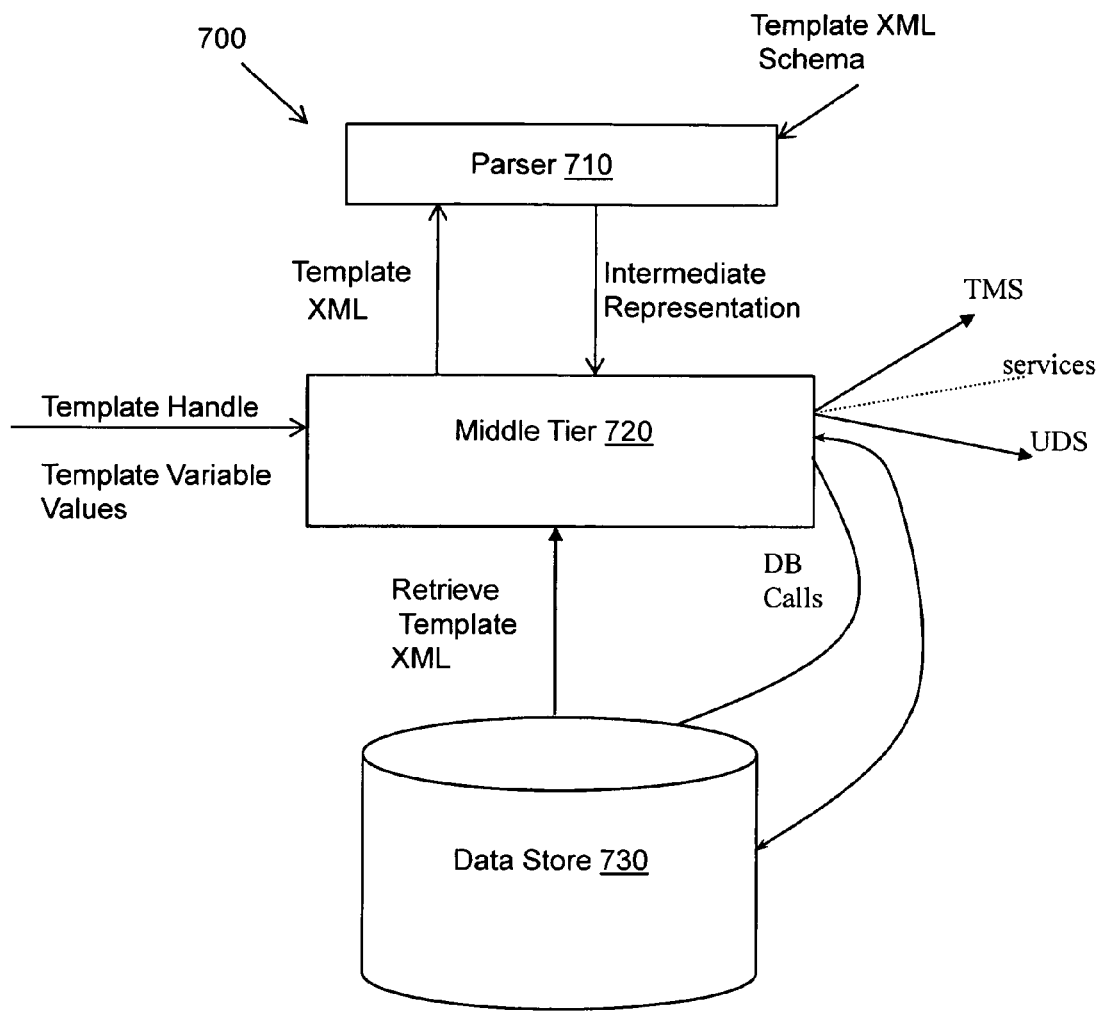
FIG. 7 illustrates an example embodiment of a prior art system associated with the interpretation of templates.

Referring first to FIG. 7, a prior art technique for template instantiation 700 is illustrated that uses an interpretation process. Typically, when a template is instantiated in response to a request, a serialized representation of the template (e.g., an XML document) is fetched from a template data store 730 to a middle tier 720 between the data store and an entity requesting the instantiation. The serialized representation may then be parsed by a parser 710 into an in-memory intermediate representation (e.g., a Java Content Tree). This intermediate representation is used to determine which, if any, services are needed to instantiate the template. The intermediate representation is also used to determine what, if any, data from a database is required to complete the instantiation request. The middle tier traverses the intermediate representation and makes the required service calls and database calls to create entities specified in the template. These calls may include calls to a time management service (TMS), a user directory service (UDS), and other services. This interpretation process is performed each time instantiation of the template is requested, resulting in significant overhead in terms of memory and processing requirements and response time degradation.

Systems and methods associated with executable templates are described. In one example embodiment, a template is compiled a single time into an executable template by a middle tier server when it is initially created. In one example embodiment, the template is compiled into a PL/SQL (procedural language/structured query language) procedure. The executable template is stored to a template data store on a data server. The data server may also have access to multiple local databases and request resources from multiple local services.

When a middle tier server attempts to instantiate, on behalf of an entity, a template for which an executable template exists, the executable template makes calls to local databases and services to create the requested instantiated entities. The instantiated entities are provided back to the middle tier server. The middle tier server may then be able to provide the instantiated entities back to the entity that requested the template instantiation without further requests to the data server or other system resources. Invoking an executable template in this manner on a data server may free up network resources as fewer middle tier to database requests are made. Further, if the template is constructed locally on the data server, this may free up resources on middle tier servers. In network architectures where bandwidth and middle tier processing resources are scarce, freeing up network and middle tier resources in this manner may improve performance.

In another example embodiment, it may not be possible to compile some portions of the template into an executable template. This may occur when a service required to instantiate an entity specified in the template is not available via an application programming interface (API) in the target language in which the executable template is generated (e.g., if the target language is PL/SQL and there is no PL/SQL API for creating the specified entity). In this example embodiment, the compilable portions of the template are separated from portions of the template that are non-compilable. This separation process may include identifying a non-compilable portion of a template as well as any descendants of the identified portion as non-compilable. An executable template containing compilable portions of the template and a serialized representation containing non-compilable portions of the template are created.

When the middle tier server requests instantiation of a template containing both a non-compilable portion and a compilable portion, the middle tier server invokes an executable template as described above. The middle tier server also loads a serialized representation into memory, and performs actions and/or makes requests associated with the non-compilable portion of the template. The middle tier server then combines the results of the actions and requests (e.g. instantiated entities) associated with the non-compilable portion with the instantiated entities that resulted from the execution of the executable template. The middle tier then returns a handle to the instantiated entities to a requesting entity. Thus, the compilable portions of the template are processed in the improved manner, providing the benefit of lower processing overhead and improved response time to the extent possible.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

To the extent that the terms "contain", "store", and so on are employed herein, (e.g., a data store to store a value, a signal containing a datum), it is intended to mean that a portion of memory associated with the storing element either holds the stored element, or that a value in a portion of memory associated with the storing element identifies memory holding the stored element. Further, in the latter example, the portion of memory associated with the storing element may hold an identifier (e.g., a pointer) directly indicating a portion of memory containing the stored element, or the portion of memory associated with the storing element may hold an identifier indicating a data structure that holds the stored element.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
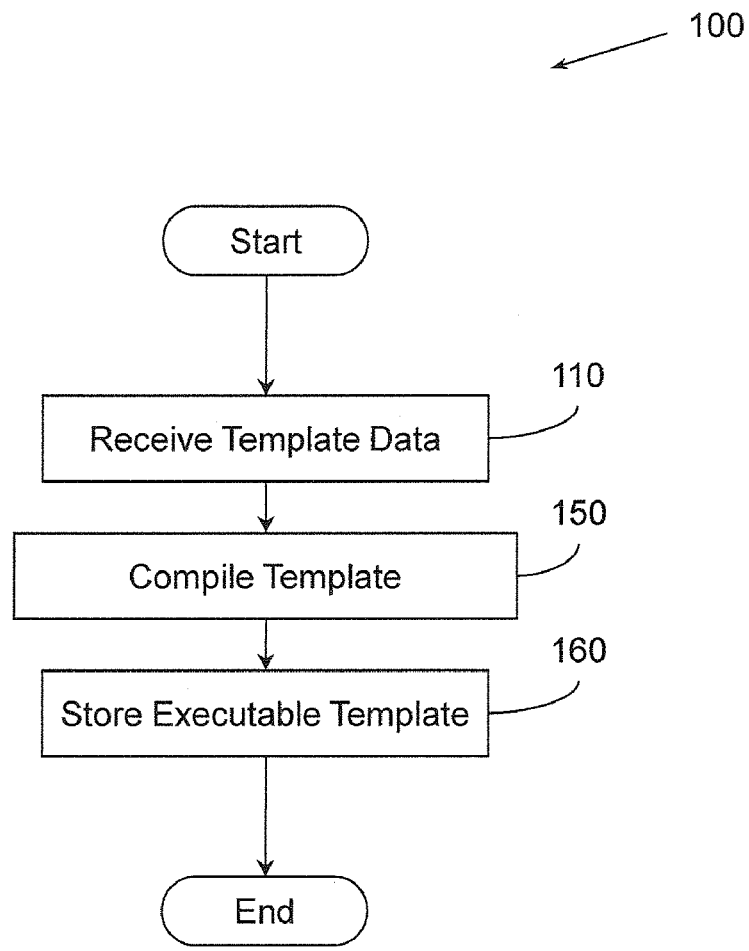
FIG. 1 illustrates an example embodiment of a method associated with executable templates.

Referring now to FIG. 1 a method 100 associated with executable templates is illustrated. Method 100 includes, at 110, receiving a set of template data. In one example embodiment, the template data may be received upon creation of the template from a user and/or a logic. The template data may be, for example, a web page template, a project management workspace template, a document template, a new product launch template, and so on. Thus, the template data specifies parameterized information about the structure and content of the entities that are created when the template is instantiated. The template may also contain template variables whose values are passed at the time of template instantiation.

Method 100 also includes, at 150, compiling the set of template data into an executable template. The executable template may be, for example compiled into a procedural language/structured query language (PL/SQL) procedure. However, a person having ordinary skill in the art can see how a different executable format may be appropriate. Method 100 also includes at 160, storing the executable template in a data store. The data store may be associated with a data server containing multiple data stores. One of the data stores may be a relational database. Further, services referenced by the template data may operate on the data server. Thus, in one example embodiment, an executable template may be configured to execute on the data server. In this example embodiment, the executable template is configured to call local services and may make local database queries. The executable template may also be configured to combine results of these service requests and database queries to create the instantiated entities that the executable template generates.

While FIG. 1 illustrates various actions occurring in serial, it is to be appreciated that various actions illustrated in FIG. 1 could occur substantially in parallel. By way of illustration, a first process could receive template data, a second process could compile an executable template, and a third process could store the executable template. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 2:
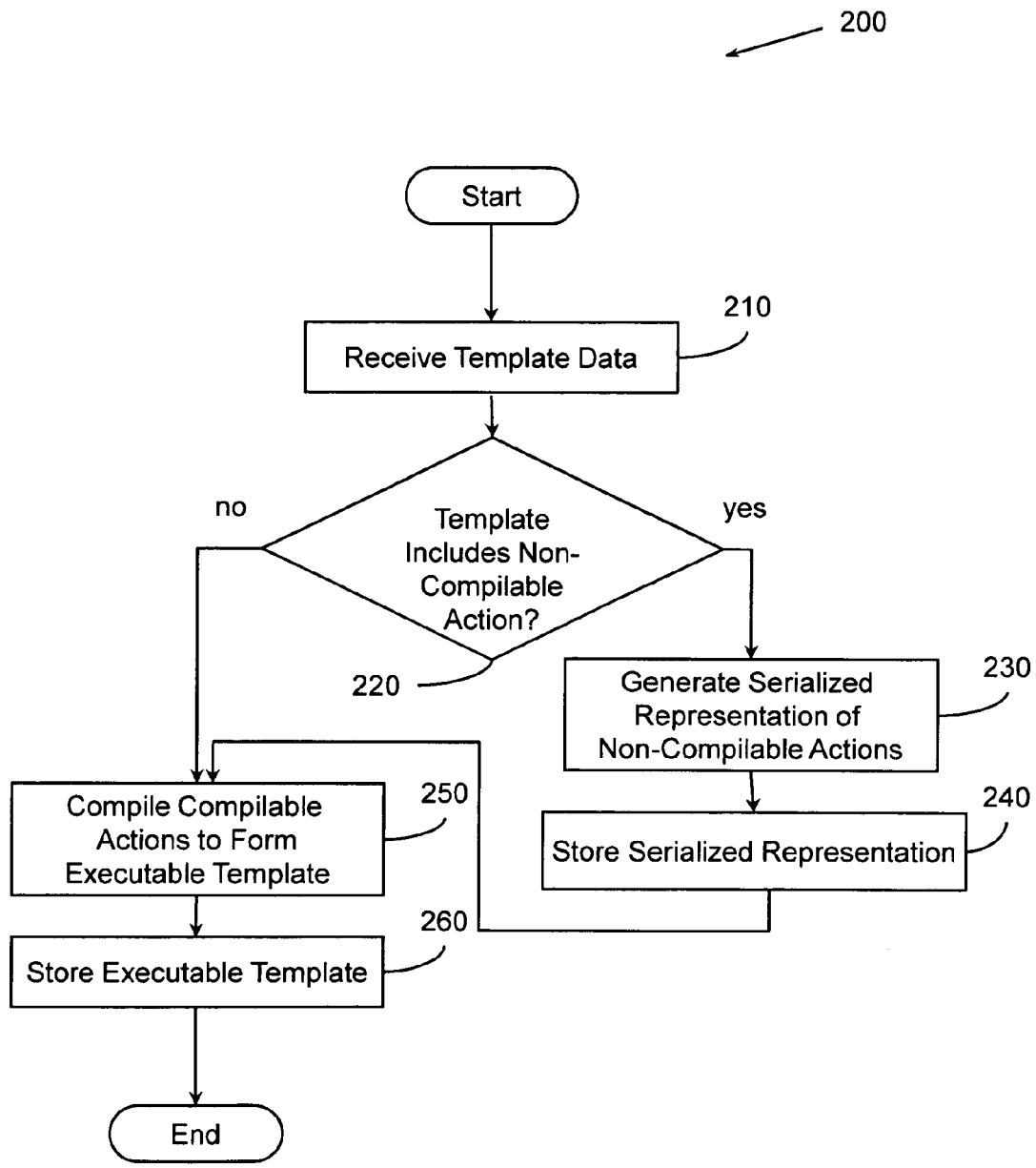
FIG. 2 illustrates an example embodiment of a method associated with executable templates.

FIG. 2 illustrates a method 200 associated with executable templates. Method 200 includes several actions similar to those described in connection with method 100 (FIG. 1). For example, method 200 includes receiving template data at 210, compiling an executable template at 250, and storing the executable template at 260. However, method 200 includes additional actions.

Method 200 includes, at 220, determining whether the template data references a non-compilable action. A non-compilable action may include a service call that is not available via an application programming interface (API) in the target language in which the executable template is generated.

In the event that no non-compilable actions are found, the template data may be compiled into an executable template at 250 as in method 100 (see FIG. 1). However, if it is determined that the template data specifies a non-compilable action, method 200 may proceed by generating a serialized representation at 230. In one example, a serialized representation may be an extensible markup language (XML) document. However, a person having ordinary skill in the art can see how other formats may be used for storing a serialized representation. Generating a serialized representation may include separating portions of the template data into compilable portions and non-compilable portions. In one example embodiment, a first portion of the template data that depends on a second, non-compilable portion of the template data may be treated as a non-compilable portion, even if the first portion may include elements that would otherwise be considered compilable. Thus, non-compilable portions of the template data and their descendants may be included in the serialized representation generated at 230, and compilable portions of the template data may be compiled into an executable template at 250. Method 200 also includes, at 240, storing the serialized representation, and at 260, storing the executable template.

Figure 3:
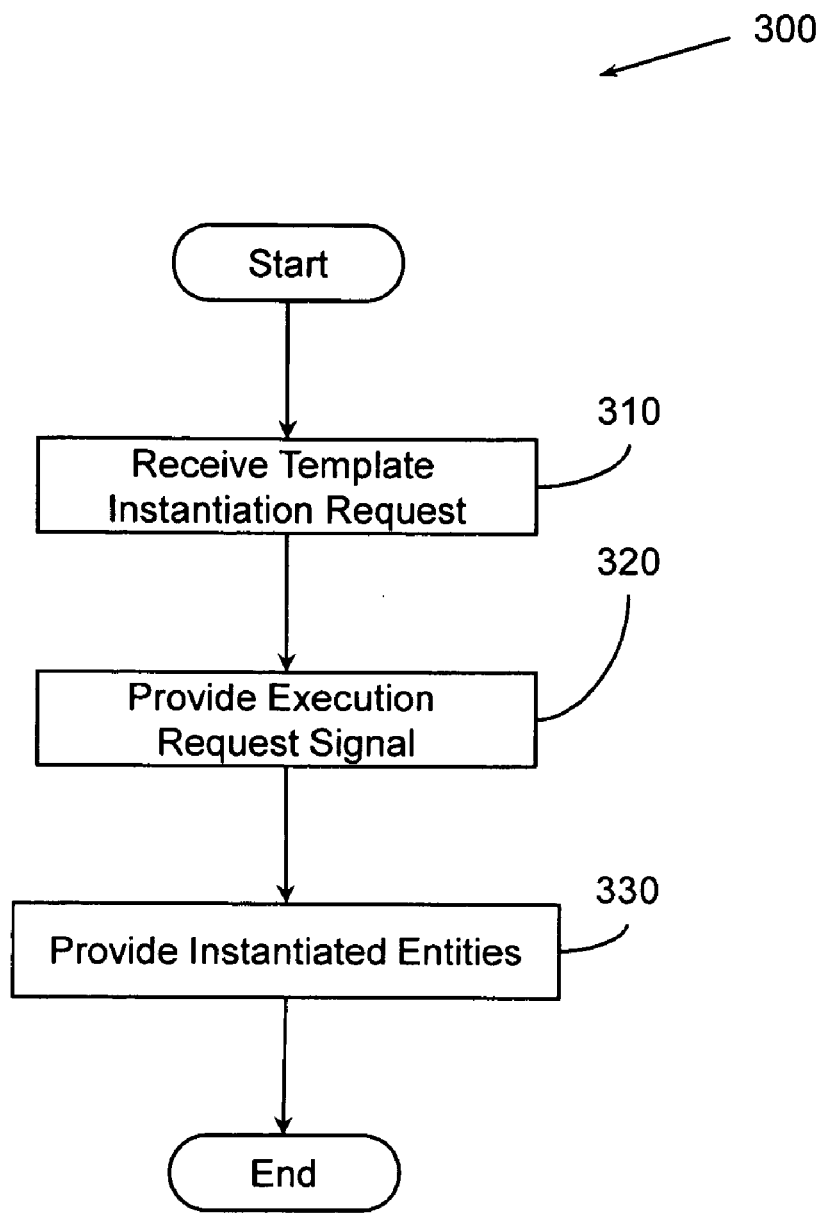
FIG. 3 illustrates an example embodiment of a method associated with executable templates.

FIG. 3 illustrates a method 300 associated with executable templates. Method 300 includes, at 310, receiving a template instantiation request signal. The template instantiation request signal may be received from a user and/or a logic. The template instantiation request signal identifies an executable template. The executable template may be, for example, a PUSQL procedure. In one example embodiment, the template instantiation request signal may include an input. The input may configure an action performed by the executable template. The action may be, for example, a service request, a database call, and so on. Thus, the input may identify a set of data in a database for the executable template to request and combine into the instantiated entities over the course of the operation of the executable template.

Method 300 also includes, at 320, providing an execution request signal for the executable template. The execution request signal may be provided to a data server on which the executable template is stored. The execution request signal controls the data server to execute the executable template. The executable template creates instantiated entities while the executable template is running. In one example embodiment, the execution request signal may include the input received in the template instantiation request signal thereby facilitating the provision of the input to the executable template. Method 300 also includes, at 330 receiving the instantiated entities. The instantiated entities may be, for example, a workspace that includes a folder and a task list. The instantiated entities are generated by execution of the executable template by the data server. Method 300 also includes, at 380, providing the instantiated entities. For example, a handle to the instantiated entities may be provided to, for example, a user and/or a logic that initially requested execution of the executable template.

Figure 4:
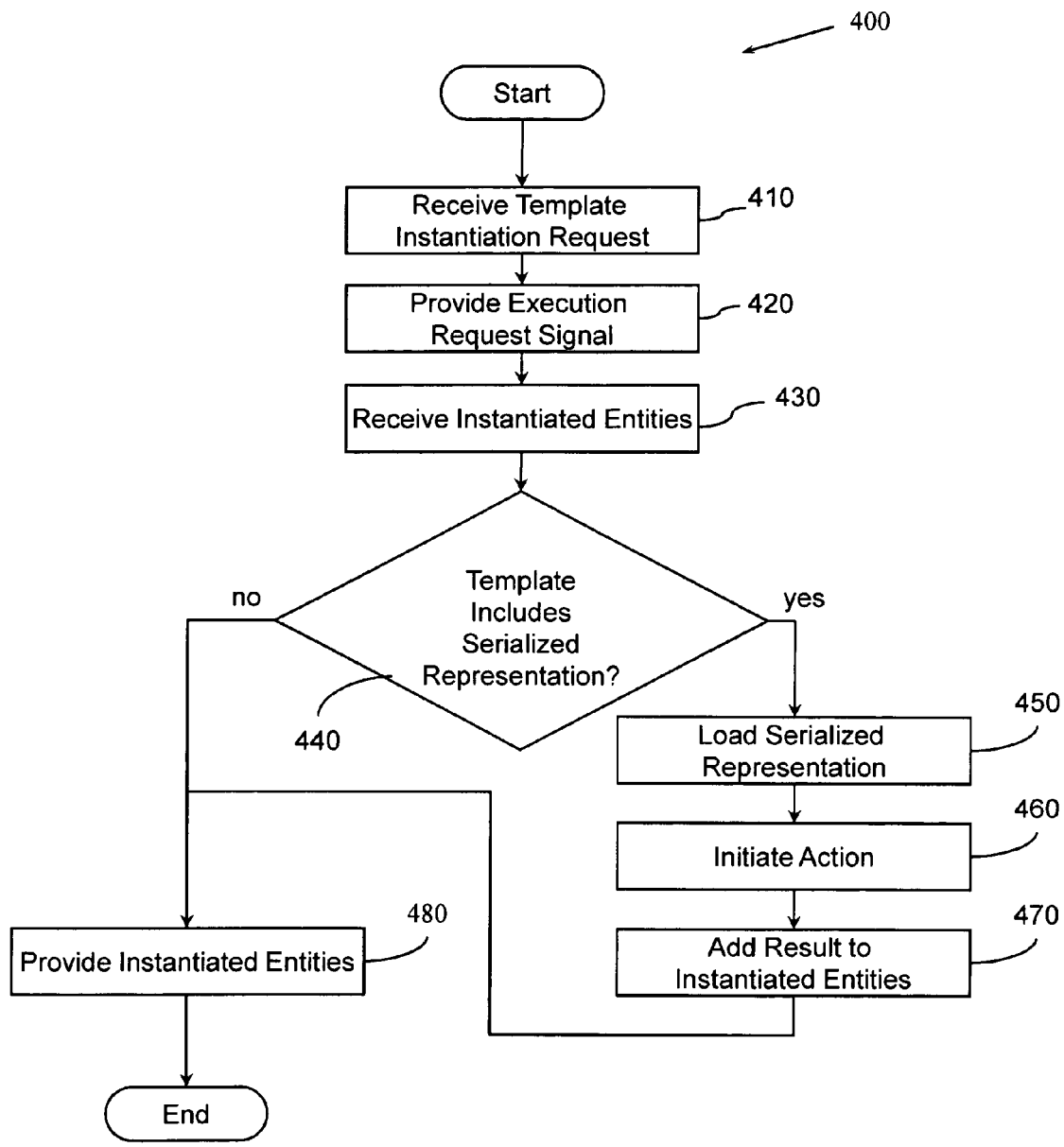
FIG. 4 illustrates an example embodiment of a method associated with executable templates.

FIG. 4 illustrates a method 400 associated with executable templates. Method 400 includes several actions similar to those described in connection with method 300 (FIG. 3). For example, method 400 includes receiving a template instantiation request signal at 410, providing an execution request signal at 420, receiving instantiated entities at 430, and providing the instantiated entities at 480. However, method 400 includes additional actions.

Method 400 includes, at 440, determining whether the template instantiation request signal identifies a serialized representation in addition to an executable template. In the event that the template instantiation request signal does not identify a serialized representation, method 400 may proceed to providing the instantiated entities at 480 as described in method 300 (see FIG. 3). However, if method 400 determines that the template instantiation request signal does identify a serialized representation, method 400 may proceed, at 450, by loading the serialized representation. In one example, the serialized representation may be loaded by a middle tier template construction logic that may not be co-located with a data server. The serialized representation may be, for example, an XML document.

Method 400 also includes, at 460, initiating an action identified by the serialized representation. The action may be related to a service and/or a resource that is not available via an application programming interface (API) in the target language in which the executable template is generated. Method 400 also includes, at 470, adding a result of the action to the instantiated entities. While adding a result of the action to the instantiated entities is described, one with ordinary skill in the art can see how adding a portion of the instantiated entities to the result may be advantageous in some situations.

Figure 5:
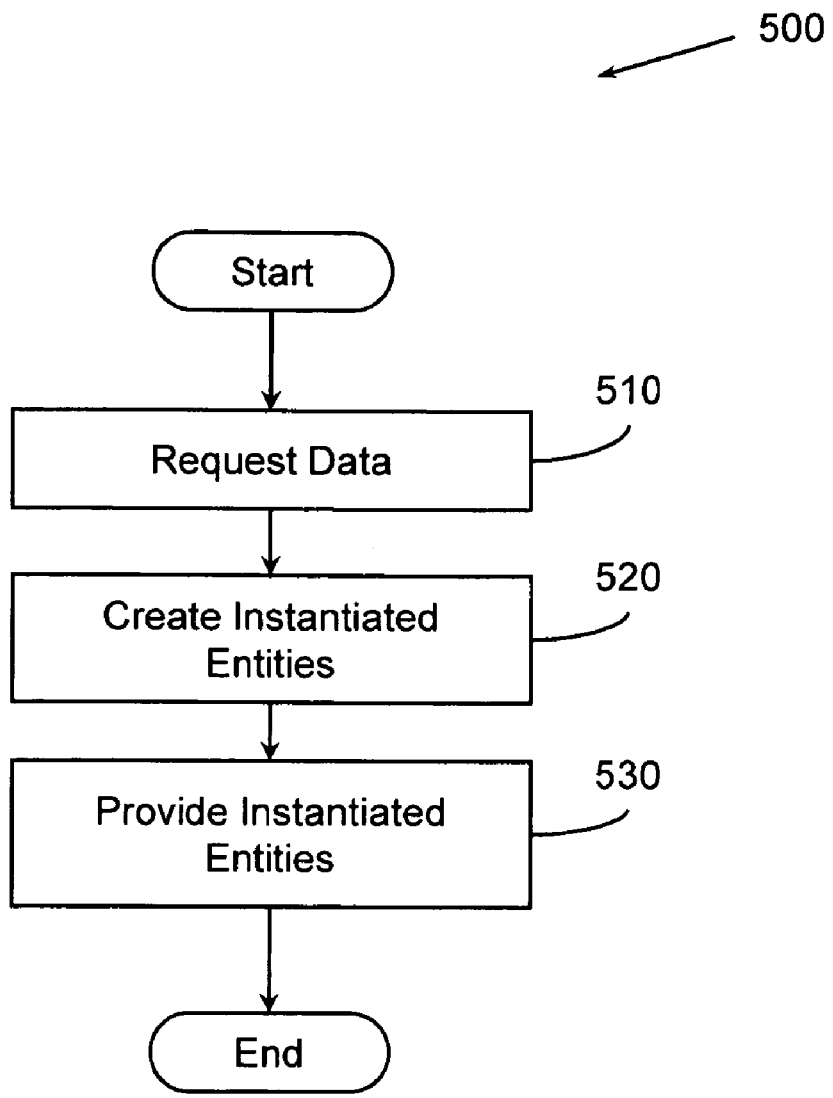
FIG. 5 illustrates an example embodiment of a method associated with executable templates.

FIG. 5 illustrates a method 500 associated an example operation of an executable template. In one example, the method 500 may be configured to execute on a system on which the data store is located (e.g., a data server). Method 500 includes, at 510, requesting a set of data from a data store based on a set of inputs. Method 500 also includes, at 520, creating instantiated entities. The instantiated entities may be created by combining the set of data with a set of template data. Thus the set of inputs may specify the set of data from the data store to be combined with the set of template data. Method 500 also includes, at 530, providing the instantiated entities.

Thus, method 100 (FIG. 1) and method 200 (FIG. 2) relate to the construction of an executable template based on a set of template data. Method 300 (FIG. 3) and method 400 (FIG. 4) relate to the processing of requests for the instantiation of fully and partially executable templates, respectively. Finally, method 500 (FIG. 5) relates to the conditions under which an executable template itself operates.

Figure 6:
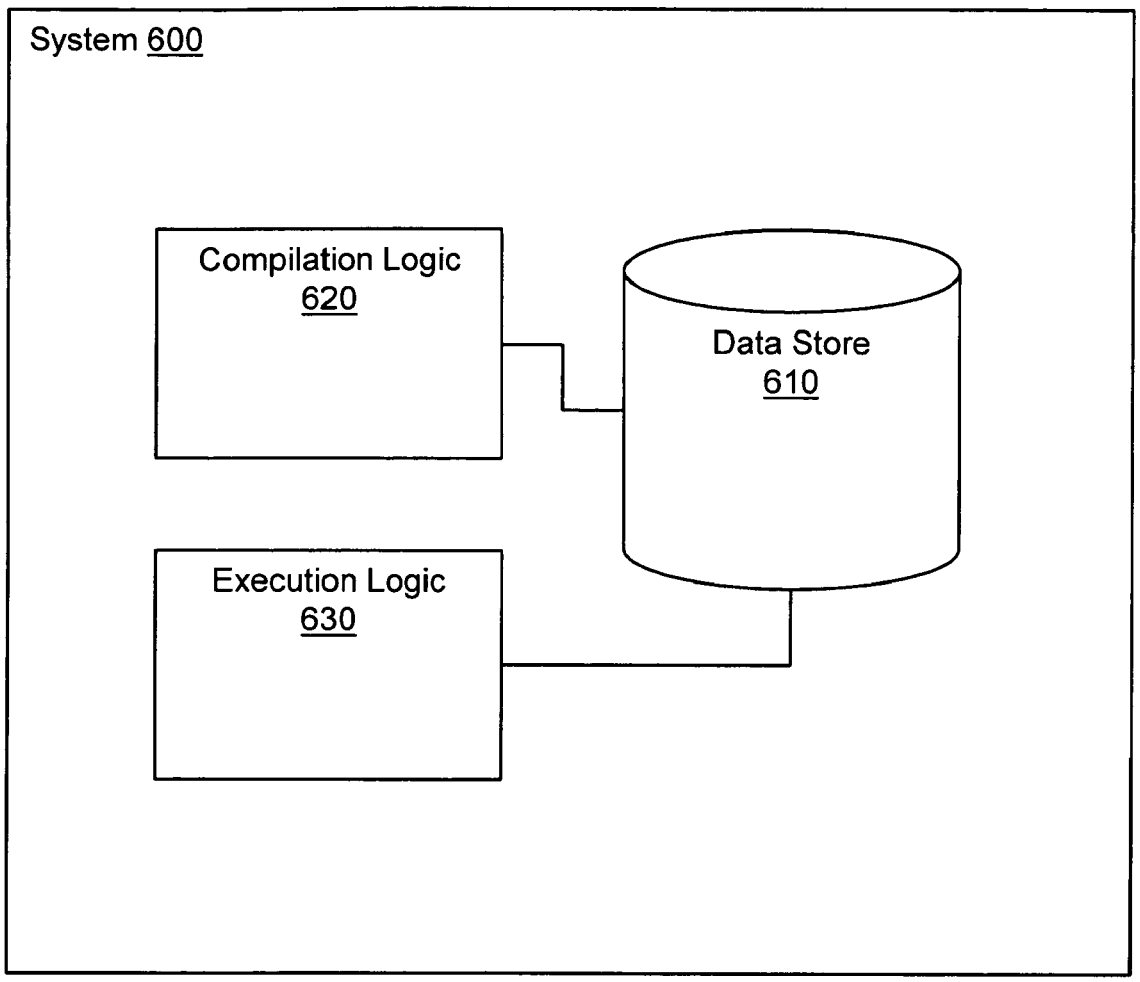
FIG. 6 illustrates an example embodiment of a system associated with executable templates.

FIG. 6 illustrates a system 600 associated with executable templates. System 600 includes a data store 610. Data store 610 may store data and/or an executable template. An executable template creates instantiated entities when the executable template is executed. The executable template may create the instantiated entities by combining a set of template data contained in the executable template with a portion of the data from the data store. The instantiated entities may be, for example, a workspace that includes a folder and a task list. In one example, the data may be stored as a relational database in data store 610. In another example, data store 610 may be associated with a data server (not shown). The data server may be a system optimized for providing information from data store 610. However, the data server may be able to perform additional operations.

System 600 also includes a compilation logic 620. In one example embodiment, the compilation logic 620 generates the executable template. The compilation logic 620 may also store the executable template in the data store 610. The compilation logic 620 generates the executable template in response to receiving a set of template data. The template data may include a non-compilable portion and a compilable portion of data. Thus, the compilation logic 620 compiles the compilable portion into an executable template. The compilation logic 620 may also generate a serialized representation of the non-compilable portion.

System 600 also includes an execution logic 630. The execution logic 630 may request instantiated entities be created by execution of the executable template. The instantiated entities may be requested in response to a signal from a user and/or a logic. In one example embodiment, the execution logic 630 may also load a serialized representation. The serialized representation may be loaded when the execution logic 630 determines that a requested template requires information from both an executable template and the serialized representation to be complete. Thus, the execution logic 630 may also initiate an action identified by the serialized representation. Further, the execution logic 630 may add a result of the action to the instantiated entities generated by the executable template. The execution logic 630 may then provide the instantiated entities. The instantiated entities may be provided as a handle to the instantiated entities to, for example, a user and/or a logic that requested the execution of the executable template.

Figure 8:
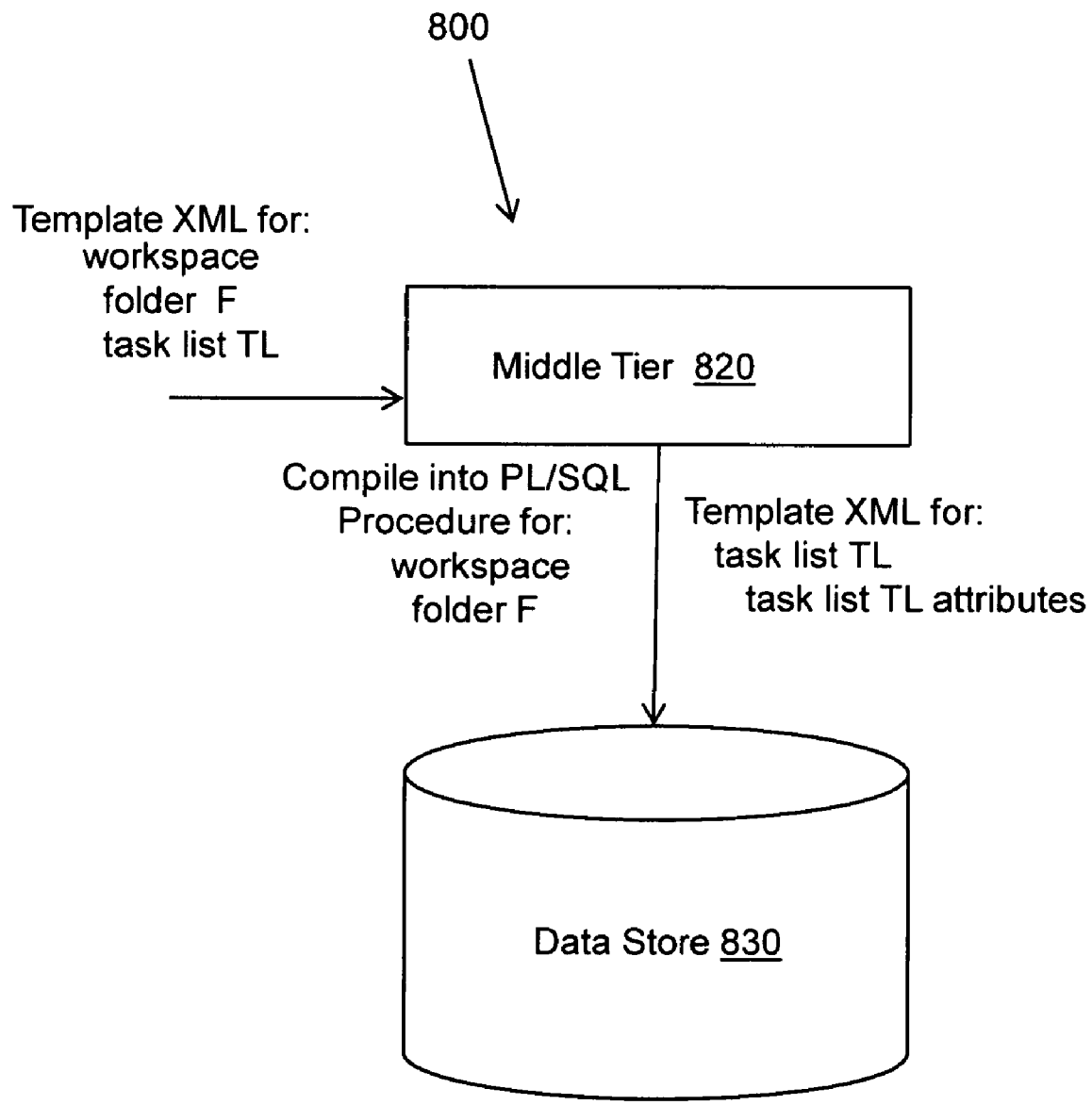
FIG. 8 illustrates an example embodiment of a system associated with executable templates.
Figure 9:
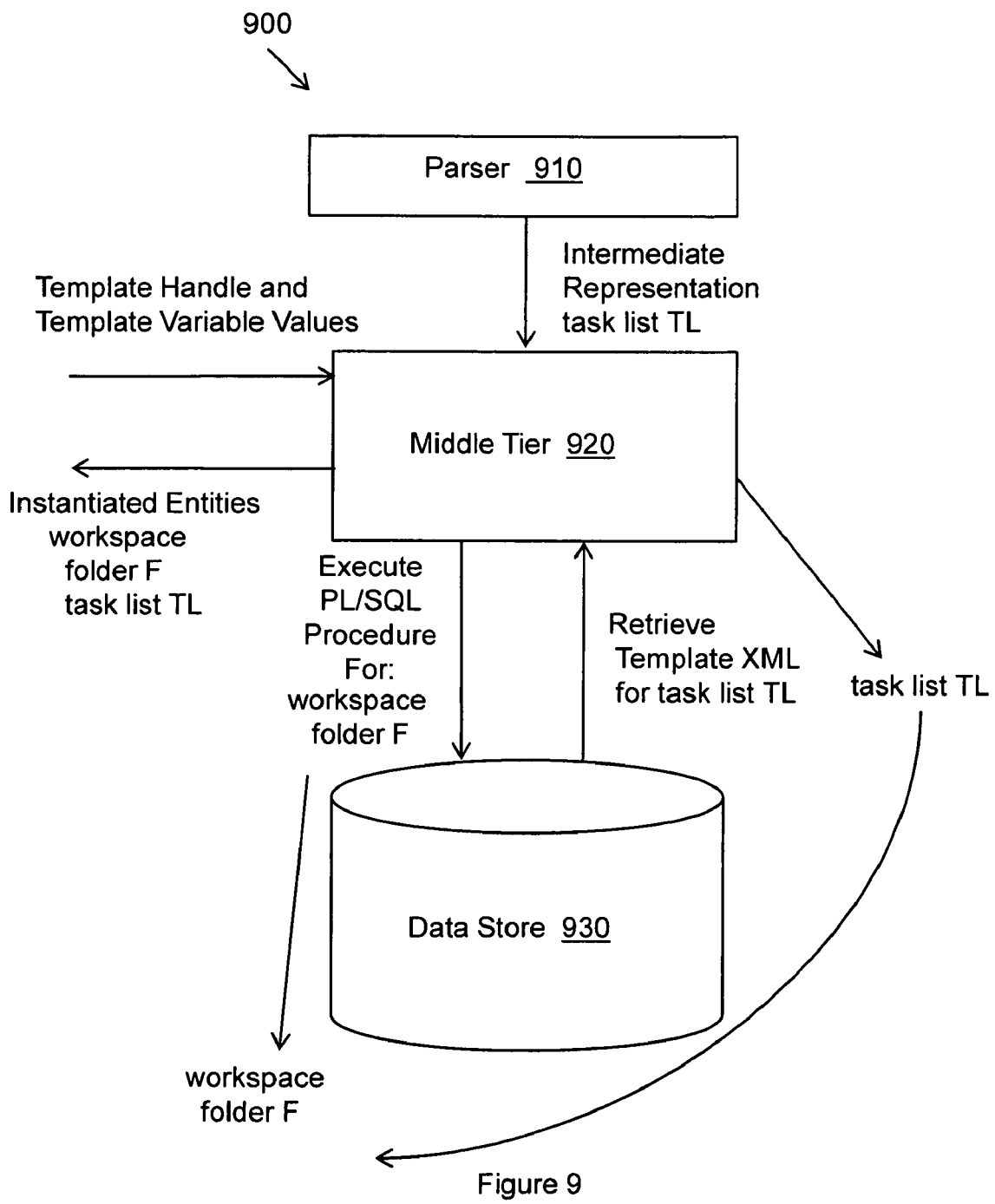
FIG. 9 illustrates an example embodiment of a system associated with executable templates.

FIGS. 8 and 9 illustrate an example embodiment of template instantiation performed using an executable template. FIG. 8 illustrates, in functional blocks, the creation 800 of an executable template and an XML template corresponding to any non-compilable portions of the template. A middle tier receives a template XML for which an executable template is to be generated. The template is a workspace template that specifies a folder F and a task list TL. In this example, the middle tier identifies that there is no PL/SQL API for creating a task list. The middle tier 820 stores a serialized representation of the task list portion of the template in the data store 830. The middle tier 820 compiles the compilable portions of the template, corresponding to the workspace and folder F into a PL/SQL procedure and stores the procedure in the data store 830.

FIG. 9 illustrates, in functional blocks, the instantiation 900 of the template for which the executable template was generated in FIG. 8. The middle tier 920 receives a request for instantiating the workspace template that includes folder F and task list TL. The middle tier calls for the execution of the PL/SQL procedure, that is stored in the data store 930, to create the workspace and folder F. The middle tier 920 then retrieves the template XML for the task list TL and interprets the template by sending it to the parser 910 and traversing the structure created by the parser to create the task list TL entity. The task list TL is then combined with the workspace and folder F to complete the set of instantiated entities.

Figure 10:
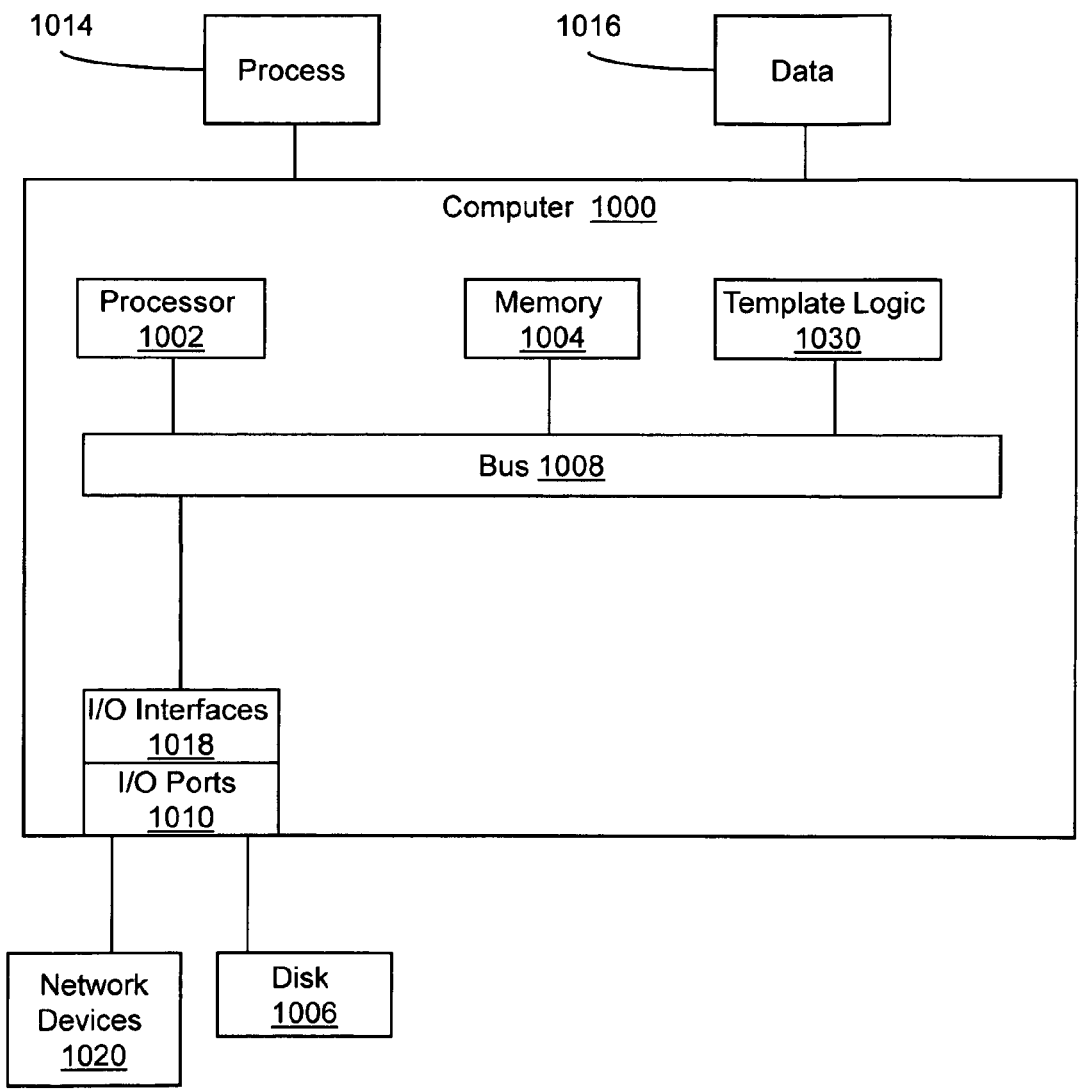
FIG. 10 illustrates an example computing environment in which example systems and methods, and equivalents, may operate.

FIG. 10 illustrates an example computing device in which example systems and methods described herein, and equivalents, may operate. The following acronyms are used with reference to FIG. 10 and are defined as follows:

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
SQL: structured query language.
OQL: object query language.
USB: universal serial bus.
XML: extensible markup language.
WAN: wide area network.

The example computing device may be a computer 1000 that includes a processor 1002, a memory 1004, and input/output ports 1010 operably connected by a bus 1008. In one example, the computer 1000 may include a template logic 1030 configured to facilitate generating an executable template. In different examples, the logic 1030 may be implemented in hardware, software, firmware, and/or combinations thereof. While the logic 1030 is illustrated as a hardware component attached to the bus 1008, it is to be appreciated that in one example, the logic 1030 could be implemented in the processor 1002.

Thus, logic 1030 may provide means (e.g., hardware, software, firmware) for generating an executable template. Logic 1030 may also provide means (e.g., hardware, software, firmware) for executing an executable template. Logic 1030 may also provide means (e.g., hardware, software, firmware) for providing any instantiated entities that result from execution of an executable template. The means associated with logic 1030 may be implemented, for example, as an ASIC. The means may also be implemented as computer executable instructions that are presented to computer 1000 as data 1016 that are temporarily stored in memory 1004 and then executed by processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM drive, a Blu-Ray drive, an HD-DVD drive, and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
   receiving a set of template data;
   identifying compilable portions and non-compilable portions of the set of template data;
   compiling, using at least a processor, the compilable portions into an executable template;
   generating a serialized template representing the non-compilable portions, wherein the serialized template is non-executable;
   generating a template that is formed by both the executable template and the serialized template; and
   upon receiving a request to instantiate an entity using the template, executing the executable template to generate first results;
      initiating actions identified by the serialized template to generate second results; and
      generating the entity by combining the first results and the second results.

2. The computer-readable medium of claim 1, wherein identifying the non-compilable portions comprises:
   determining that a portion of the template data specifies one or more non-compilable actions;
   generating a serialized representation of the portion of the template data that specifies the one or more non-compilable actions; and
   storing the serialized representation in the serialized template in a hardware data store.

3. The computer-readable medium of claim 1, wherein the serialized template is generated as an extensible markup language (XML) document.

4. The computer-readable medium of claim 1, where the executable template is a procedural language/structured query language (PL/SQL) procedure.

5. The method of claim 1, wherein the non-compilable portions are identified by an action in the template data that includes a service call that is not available via an application programming interface.

6. A system, comprising:
   a hardware data store;
   a non-transitory computer readable medium that stores instructions that implement a compilation logic configured to:
      identify compilable portions and non-compilable portions of a set of template data
      compile, using at least a processor, the compilable portions into an executable template and store the executable template in the hardware data store;
      generate a serialized template representing the non-compilable portions, wherein the serialized template is non-executable;
      wherein a template is defined by both the executable template and the serialized template;
   an execution logic configured to instantiate an entity using the template and input data by:
      executing the executable template and applying the input data to generate first results;
      initiating actions identified by the serialized template using portions of the input data to generate second results; and
      generating the entity by combining the first results and the second results.

7. The system of claim 6, where the execution logic is further configured to load the serialized template into a memory prior to initiating actions identified by the serialized template.

8. The system of claim 6 where the executable template is a procedural language/structured query language (PL/SQL) procedure.

9. A computer implemented method, the method comprising:
   parsing a set of template data stored in a computer memory;
   identifying, using at least a processor, compilable portions and non-compilable portions of the set of template data;
   compiling, using at least the processor, the compilable portions into an executable template;
   generating a serialized template representing the non-compilable portions, wherein the serialized template is non-executable; and
   upon receiving a request to instantiate an entity using a template, executing the executable template to generate first results;
      initiating actions identified by the serialized template to generate second results; and
      generating the entity by combining the first results and the second results.

10. The method of claim 9, wherein the non-compilable portions are identified by an action in the template data that includes a service call that is not available via an application programming interface.

* * * * *

UNITED STATES PATENT AND TRADEMARK OFFICE
CERTIFICATE OF CORRECTION

PATENT NO.         : 8,321,846 B2
APPLICATION NO.    : 12/291751
DATED              : November 27, 2012
INVENTOR(S)        : Chatterjee Page 1 of 1

It is certified that error appears in the above-identified patent and that said Letters Patent is hereby corrected as shown below:

In column 7, line 4, delete "PUSQL" and insert -- PL/SQL --, therefor.

In column 11, line 40, in claim 5, delete "method of" and insert -- computer-readable medium of --, therefor.

Signed and Sealed this
Twelfth Day of March, 2013

Teresa Stanek Rea
*Acting Director of the United States Patent and Trademark Office*